Nov. 17, 1953 V. D. LANDON 2,659,866

PULSE MODULATION SYSTEM

Filed Nov. 16, 1951 2 Sheets-Sheet 1

INVENTOR
VERNON D. LANDON
BY
Charles H. Brown
ATTORNEY

INVENTOR
VERNON D. LANDON
BY
Charles H. Brown
ATTORNEY

Patented Nov. 17, 1953 2,659,866

UNITED STATES PATENT OFFICE 2,659,866

PULSE MODULATION SYSTEM

Vernon David Landon, Princeton Township, Mercer County, N. J., assignor to Radio Corporation of America, a corporation of Delaware Application November 16, 1951, Serial No. 256,802

6 Claims. (Cl. 332—12)

This invention relates to pulse modulation circuits, and more particularly to a multiplex time division system having means for generating and modulating pulses.

An object of this invention is to provide a novel system for generating a train of sequentially occurring pulses and simultaneously impressing modulation thereon in accordance with the intelligence from a plurality of separate sources.

Another object of this invention is to provide a simple combination pulse generator and modulator suitable for multiplex pulse communication systems.

The invention is herein described in connection with a pulse multiplex time division system in which there is provided a source of periodic waves or alternating current voltage having a fundamental frequency equal to the pulse frame repetition rate (i. e. the channel sampling rate). This voltage is fed in the same phase to each of a plurality of single channel modulators in the multiplex system. The channel modulators contain saturable core inductors which produce a pulse of voltage when the rate of change of flux through the inductor is maximum, that is, when the flux is passing through zero. The saturable core inductors are saturated at all but extremely low values of resultant flux. Each channel modulator also contains a local biasing arrangement to shift the zero axis of the alternating wave, as well as a means for impressing the signal voltage on the same saturable core. The local biasing voltage source for each channel is adjusted so that no two channels produce a pulse of the same polarity at the same time, as a result of which there is obtained a series of pulses in time-spaced relation. Impressing a source of signal energy on the same core will delay or accelerate the production of the pulse, giving pulse-position modulation. A polyphase source of reference voltage may be utilized to enable several groups of pulses to be spaced over the entire pulse frame interval. With the polyphase source of voltage, the modulators can operate on the portion of the alternating current wave which produces most linear pulse position displacement.

A feature of the invention is the complete transmitting terminal which generates and modulates the respective positions of a chain of pulses in accordance with intelligence from a plurality of sources without the use of electron discharge devices.

A more detailed description of the invention follows with reference to the accompanying drawing, in which.

Figure 4A:
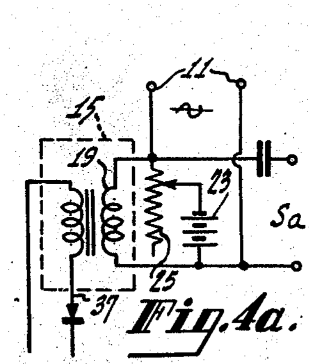
Figure 4B:
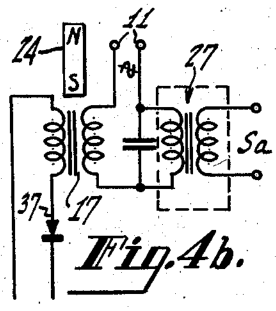
Figure 4C:
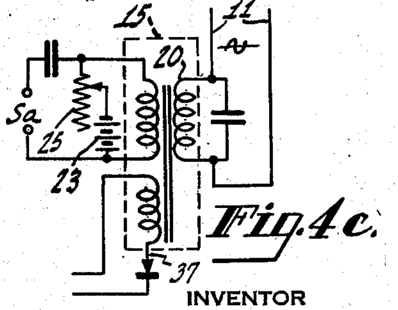
Figures 5, 6:
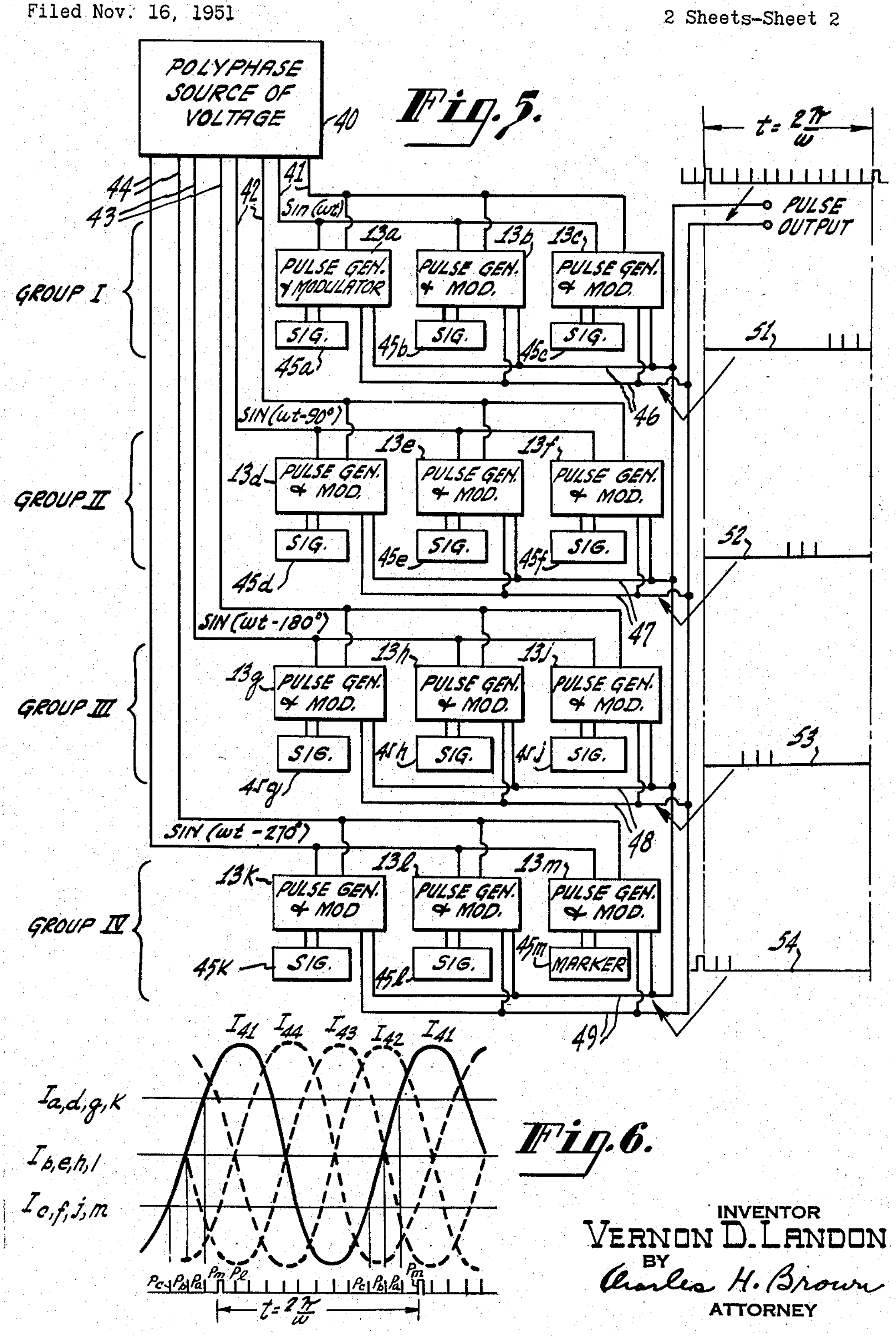

Figs. 4*a*, 4*b* and 4*c* show alternative types of combination pulse generators and modulators;

Fig. 5 is a complete transmitting terminal according to the invention; and

Fig. 6 shows curves explanatory of the operation of Fig. 5.

Figure 1:
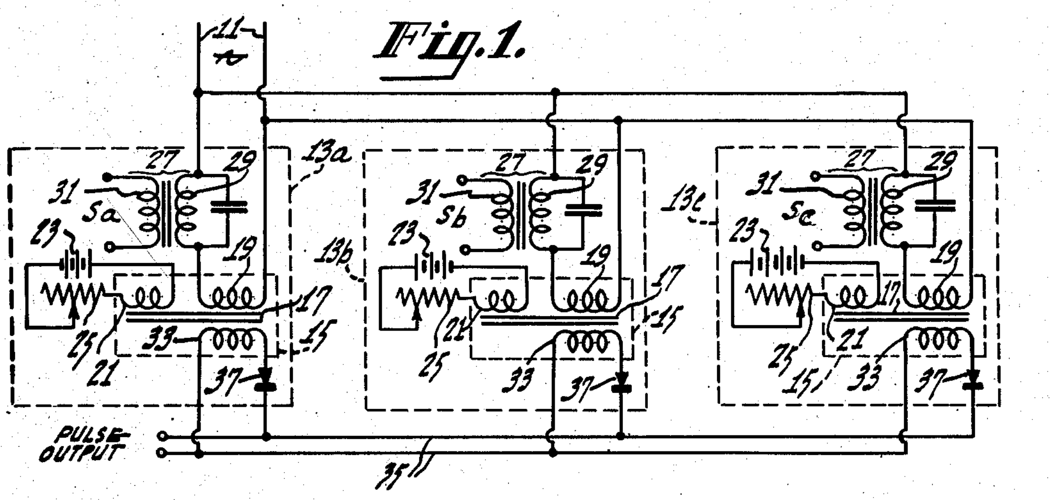
Fig. 1 shows a circuit operable according to this invention.

Referring to Fig. 1, there is shown a pulse multiplex system in which a source of periodic waves or alternating current potential 11 supplies energy of sine waveform to a group of individual channel pulse generators and modulators 13*a*, 13*b*, and 13*c*, shown within dotted line boxes. These channel pulse generators and modulators are fed with different modulating waves S*a*, S*b* and S*c* which may be voice, telegraph, or other suitable intelligence. Since all three pulse generators and modulators 13*a*, 13*b* and 13*c* are alike in circuitry and operate similarly, it is deemed necessary to explain the operation of only one of these circuits, for example 13*a*.

Each channel pulse generator and modulator has a transformer 15 which contains a saturable core 17. A primary winding 19 is supplied with the alternating current from the source 11. A biasing winding 21 in series with a source of unidirectional potential 23 and a biasing current regulating resistor 25 is provided for magnetically biasing the saturable core 17. Signal modulation is also impressed on the primary winding 19 by means of a signal input transformer 27 which has its secondary winding 29 in series between the primary winding 19 of the saturable core modulating transformer 15 and the source of alternating current potential 11. The source of signal currents $S_a$ is connected across the primary winding 31 of the signal input transformer 27. The transformer 15 has an output winding 33 connected across a output line 35. A diode 37 is connected in series with the output winding 33 across the output line 35 so that a pulse of only one polarity will be impressed across the output line 35.

Figure 2:
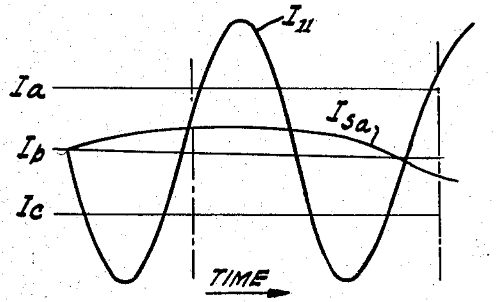
Fig. 2 and 3 are curves explanatory of the invention.
Figure 3:
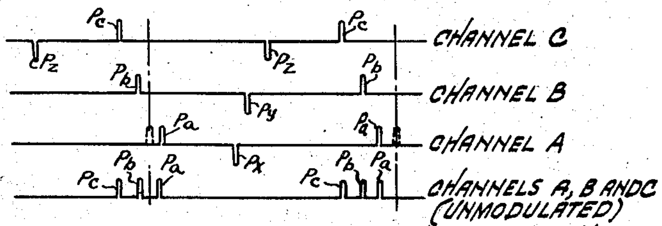

The operation of Fig. 1 may be better understood by referring to the graphs of Figs. 2 and 3. Fig. 2 shows current wave forms in the windings of the saturable core transformer 15 which produce the total flux therein. The curve designated $I_{11}$ represents the current in the primary winding 19 due to the alternating current source 11. The curve labeled $I_a$ is the direct current component $I_a$ resulting from the magnetic bias produced by winding 21. The current $I_{sa}$ is that current in the primary winding 19 resulting from the modulating signal voltage $S_a$.

Let us assume first that no modulating signal $S_a$ is present, but that the alternating current source 11 is producing a current wave $I_{11}$. Each of the modulators 13*a*, 13*b* and 13*c* in the different channels fed from the common source of potential 11 is biased a different amount so that they produce pulses of the same polarity in time-spaced relation. These pulses are designated $P_a$, $P_b$ and $P_c$ in Fig. 3.

The time spacing of the pulses $P_a$, $P_b$ and $P_c$ arises from the apparent shifting of the alternating current axis due to the presence of the different amounts of magnetic bias in the different saturable cores 17 in the respective channels. The amount of time spacing between pulses is determined by the magnitude and direction of the steady state flux produced by the biasing current $I_a$ through the biasing winding 21.

The pulse $P_a$ is produced in the modulator 13*a* when the combination of the fluxes produced by $I_{11}$ and $I_a$ instantaneously pass through zero. This flux reversal changes the condition of the core 17 from saturation in one direction to saturation in the opposite direction in a very short interval, and induces a pulse of voltage in the output winding 33.

If now, a modulating signal is applied at $S_a$, there is produced a component of current $I_{sa}$ and consequently of flux which will alter the time at which the resultant wave of flux crosses its zero axis. This will alter the time at which the pulse $P_a$ occurs in relation to the average of all pulses in the frame interval or in reference to a marker pulse. The resultant time-altered pulses from the channel generator and modulator 13*a* are shown dotted and will be modulated in position with respect to the no-signal condition represented by the solid line pulse $P_a$.

Since the channel generator and modulator 13*b* will produce a pulse $P_x$, $P_y$ or $P_z$ of the opposite polarity when the resultant flux next reverses, these oppositely-poled pulses, $P_x$, $P_y$, $P_z$ are prohibited from being impressed across the output line 35 by the arrangement of the diode 37. The diode, of course, may be replaced by any other suitable unilateral conducting device.

Three alternative arrangements of pulse generators and modulators which may be used in any of the boxes 13*a*, 13*b* or 13*c* of Fig. 1 are shown in Figs. 4*a*, 4*b* and 4*c*. Fig. 4*a* discloses a saturable core transformer 15 having two windings. A source of alternating current potential 11 is connected across one winding 19 of the transformer. Magnetic biasing current is provided by a source of unidirectional potential 23 and a biasing current regulating resistor 25. In this arrangement, the source of signal modulation $S_a$ is coupled across the same winding of the saturable transformer 15 to which the source of alternating potential 11 and the biasing current circuit 23, 25 is connected.

In Fig. 4*b* a permanent magnet 24 is used to supply the magnetic biasing flux in the saturable core 17 to shift the apparent zero axis of the alternating current source 11. The source of signal modulation $S_a$ is coupled in series with the alternating current source 11 by means of a signal input transformer 27.

In Fig. 4*c*, the biasing current is supplied from a source of unidirectional potential 23 in series with a biasing current regulating resistor 25 through one winding of a saturable core transformer 15, and the source of signal modulation $S_a$ is coupled across the same winding. The source of alternating current potential 11 is coupled across a separate winding 20 of the saturable core transformer 15. An inspection of each of the circuit arrangements of Figs. 4*a*, 4*b* and 4*c* will show that the same general result is achieved with these circuits as that described above in connection with Fig. 1.

For a specific example of a complete pulse generating and modulating terminal according to this invention, assume that ten channels of voice communication are desired in the multiplex system. A spacing of the individual channels of 30 degrees relative to the fundamental or frame repetition frequency allows a marker channel pulse and a service channel to be additionally included in the system.

Referring now to the multiplex transmitting terminals of Fig. 5, a polyphase source of voltage 40 is utilized which produces four alternating current waves in phase quadrature and at the frame repetition frequency. A first output line 41 has impressed thereon a voltage of the general form sin $\omega t$. A second output line 42 has impressed thereon a voltage of the same form but differing by 90°, as sin $(\omega t-90°)$, while the third output line 43 has a voltage impressed thereon of the general form sin $(\omega t-180°)$, and the fourth line is fed with a voltage of the form sin $(\omega t-270°)$. The sinusoidal voltage across the line 41 is fed in parallel to each of a plurality of pulse generators and modulators 13*a*, 13*b* and 13*c* like those described above in connection with Fig. 1. Each of the pulse generators and modulators 13*a*, 13*b* or 13*c* in the group has a source of signal voltage 45 coupled thereto. Each modulator 13*a*, 13*b* or 13*c* in the group is biased so that in the no-signal condition output pulses are fed to an output line 46 with a time spacing of 30° referred to the fundamental frequency of the polyphase source of voltage 40. The entire pulse output 51 of group I is shown as a chain of three pulses each spaced from the next by 30°.

Group II also contains three pulse generators and modulators 13*d*, 13*e* and 13*f* which generate and modulate pulses according to the intelligence of signal modulation applied from sources of signal voltage 45*d*, 45*e* and 45*f*, respectively. These last modulators are similar in construction and operation to pulse generators and modulators 13*a*, 13*b* and 13*c*. The saturable cores in the individual channel modulators 13*d*, 13*e* and 13*f* are also variably biased to produce output pulses spaced 30° apart like those of group I. Due to the fact that the fundamental voltage impressed across the group II pulse generators and modulators 13*d*, 13*e*, and 13*f* differs by 90°, the chain of three pulses 52 impressed across the output line 47 of group II are spaced 90° from those of group I.

The component circuit arrangements of group III operate in the same way as those of group I and group II except that the chain of output pulses 53 impressed across the output line 48 of group III are spaced 180° from those of group I.

Group IV is similar in arrangement to the first three groups and produces a chain of pulses 54 which is impressed across the output line 49 of group IV but differing by 270° from those of group I.

A marker or synchronizing channel may be provided in one group, for example group IV. If the system contemplates the use of a wider pulse for synchronizing than is used for each of the other channels, this wider pulse may be produced by a special saturable core in the marker pulse generator 13*m* in group IV. To generate a longer marker or synchronizing pulse, such a core may have wider limits of saturation so that the length of time occupied by the flux reversal is longer. Also, of course, the synchronizing pulse $P_m$ may be of greater amplitude than the ordinary channel pulses.

In Fig. 6 there is shown graphical representation of the currents in a multishannel pulse generator and modulator according to the embodiment of the invention described in connection with Fig. 5. The alternating waves of current $I_{41}$, $I_{42}$, $I_{43}$ and $I_{44}$ represent the sinusoidal currents in the pulse generators and modulators 13 in groups I, II, III and IV, respectively. The magnetic biasing of the several saturable cores is represented by biasing currents $I_{a, d, g, k}$, $I_{b, e, h, l}$ and $I_{c, f, j, m}$. The effective value of the magnetic biasing currents in each group is adjusted to shift the flux reversal point for two of the channels 30° either side of the flux reversal point for the third channel in the group.

No modulating signal voltages or currents have been shown in Fig. 6 for each of the several channels, but it should be understood that they will operate to produce a pulse position shift or modulation as explained above in connection with Fig. 2.

It will also be seen that any of the pulse generators and modulators described above in connection with Figs. 1 and 4 may be utilized in the form of the invention shown in Fig. 5.

What is claimed is:

1. A pulse multiplex system comprising a polyphase source of alternating energy and having a plurality of channels each of which includes a channel pulse generator and pulse position modulator therein, means for feeding separate groups of said plurality of channels with different phases of said alternating energy, the channels in each group being fed with alternating energy of the same phase, each of said generators and modulators including: a saturable core inductor having at least two windings coupled through said saturable core, means coupling one phase of said alternating current energy to one winding of said inductor, means to magnetically bias said saturable core of said inductor by a different amount from the others in the same group, a source of signal modulation energy coupled to said saturable core, a unilateral conducting device coupled to the other of said windings; and an output circuit coupled to all of said unilateral conducting devices.

2. A pulse multiplex system comprising a polyphase source of alternating energy and having a plurality of channels each of which includes a channel pulse generator and pulse position modulator therein, means for feeding separate groups of said plurality of channels with different phases of said alternating energy, the channels in each group being fed with alternating energy of the same phase, each of said generators and modulators including: a saturable core inductor having a plurality of windings coupled through said saturable core, means coupling one phase of said alternating current energy to one winding of said inductor, means to magnetically bias said saturable core of said inductor by a different amount from the others in said same group, a source of signal modulation energy coupled to another of said windings, a unilateral conducting device coupled to a third of said windings; and an output circuit coupled to all of said unilateral conducting devices.

3. A multiplex pulse generator and position modulator comprising a polyphase source of alternating energy, a plurality of channel modulators each including a saturable core inductor, means for feeding separate groups of said plurality of channel modulators with different phases of alternating energy from said source, means to magnetically bias the saturable core inductors in each group differently from the others in the same group, a plurality of sources of signal modulation energy, means impressing said sources of signal modulation on different ones of said saturable cores, and an output circuit including a unilaterally conducting device inductively coupled to all of said core inductors.

4. A multiplex pulse generator and position modulator comprising a polyphase source of alternating energy, a plurality of channel modulators each including a saturable core inductor, means for feeding separate groups of said plurality of channel modulator inductors with different phases of alternating energy from said source, means to magnetically bias the saturable core inductors in each group differently from the other in the same group, a plurality of sources of signal modulation energy, means inductively coupling said sources of signal modulation through different ones of said saturable cores, and an output circuit inductively coupled to all of said saturable core inductors in electrical parallel relationship.

5. A multiplex pulse generator and position modulator comprising a polyphase source of alternating energy, a plurality of channel modulators each including a saturable core inductor having at least two windings coupled through said core, means for feeding separate groups of said plurality of channel modulators with different phases of alternating energy from said source including one of said windings, means to magnetically bias each saturable core inductor in each group by a different amount from the others in the same group, a plurality of sources of signal modulation energy, means coupling each of said plurality of sources of signal modulation to different ones of said saturable cores through said one winding of each core, and an output circuit including a unilaterally conducting device coupled to all of the other windings of said inductors.

6. A pulse multiplex system comprising a source of periodic waves and having a plurality of channels each of which includes a channel pulse generator and pulse position modulator therein, means for feeding energy from said source to all of said plurality of channels in the same phase, each of said generators and modulators including: a saturable core inductor having at least two windings coupled through said saturable core, means coupling said periodic waves to one winding of said inductor, means to magnetically bias said saturable core of said inductor by a different amount from the others coupled to said source of periodic waves, a source of signal modulation energy coupled to said saturable core, a unilateral conducting device coupled to another of said windings; and an output circuit coupled in common to all of said unilateral conducting devices.

VERNON DAVID LANDON.

References Cited in the file of this patent

UNITED STATES PATENTS

| Number | Name | Date |
|---|---|---|
| 2,284,402 | Manley et al. | May 26, 1942 |
| 2,311,796 | Warthall | Feb. 23, 1943 |
| 2,417,622 | Walsh | Mar. 18, 1947 |
| 2,424,977 | Grieg | Aug. 5, 1947 |
| 2,452,547 | Chatterjea et al. | Nov. 2, 1948 |